(12) United States Patent
Koike

(10) Patent No.: US 10,200,550 B2
(45) Date of Patent: Feb. 5, 2019

(54) DECOLORING DEVICE, IMAGE PROCESSING SYSTEM, AND DECOLORING METHOD

(71) Applicants: KABUSHIKI KAISHA TOSHIBA, Tokyo (JP); TOSHIBA TEC KABUSHIKI KAISHA, Tokyo (JP)

(72) Inventor: Sho Koike, Sunto Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/957,016

(22) Filed: Apr. 19, 2018

(65) Prior Publication Data

US 2018/0241892 A1    Aug. 23, 2018

Related U.S. Application Data

(63) Continuation of application No. 15/279,064, filed on Sep. 28, 2016, now Pat. No. 9,979,844.

(51) Int. Cl.
*B41M 7/00* (2006.01)
*H04N 1/00* (2006.01)
(Continued)

(52) U.S. Cl.
CPC ...... *H04N 1/00358* (2013.01); *B41M 7/0009* (2013.01); *G03G 15/5025* (2013.01);
(Continued)

(58) Field of Classification Search
CPC ........... H04N 1/00358; H04N 1/00374; H04N 2201/0094; H04N 2201/3269;
(Continued)

(56) References Cited

U.S. PATENT DOCUMENTS

2011/0222131 A1   9/2011   Yahata et al.
2014/0192128 A1*  7/2014   Arima ................. B41J 2/32
                                                     347/179
(Continued)

FOREIGN PATENT DOCUMENTS

| JP | 2005-210233 A | 8/2005 | |
|----|---------------|--------|---|
| JP | 2006-053875 A | 2/2006 | |
| JP | 2007-034923 A * | 2/2007 | ............... G06T 1/00 |

OTHER PUBLICATIONS

Extended European Search Report filed Feb. 7, 2018 in counterpart European Patent Application No. 17192600.9 (8 pages).

*Primary Examiner* — Yaovi M Ameh
(74) *Attorney, Agent, or Firm* — Patterson & Sheridan, LLP

(57) ABSTRACT

According to one embodiment, a decoloring device includes a reading unit, a decoloring unit, and a control unit. The reading unit is configured to read control information from a first image formed in a predetermined area of a sheet. The decoloring unit is configured to decolor a portion or entirety of a second image, different from the first image, formed on the sheet using a decolorable recording material. The control unit is configured to control erasing of the data of the second image from a storage device, based on the control information, in a case where the decoloring unit decolors the second image.

9 Claims, 13 Drawing Sheets

(51) Int. Cl.
  *G03G 21/00*  (2006.01)
  *G03G 15/00*  (2006.01)
(52) U.S. Cl.
  CPC ......... *G03G 21/00* (2013.01); *H04N 1/00374* (2013.01); *G03G 15/502* (2013.01); *G03G 15/5091* (2013.01); *H04N 2201/0094* (2013.01); *H04N 2201/3269* (2013.01)
(58) Field of Classification Search
  CPC ............... G03G 21/00; G03G 15/5025; G03G 15/5091; G03G 15/502; B41M 7/0009
  See application file for complete search history.

(56) References Cited

U.S. PATENT DOCUMENTS

| | | |
|---|---|---|
| 2015/0220444 A1 | 8/2015 | Yamamoto |
| 2015/0253709 A1 | 9/2015 | Fukaya |
| 2016/0124362 A1 | 5/2016 | Mori |

\* cited by examiner

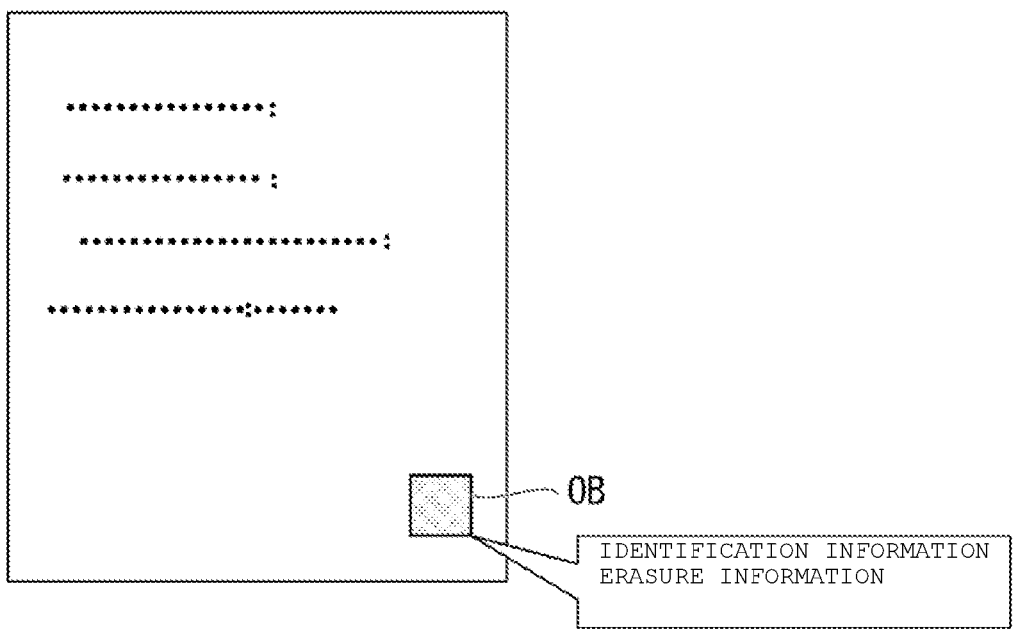

QI

DO YOU WANT TO ERASE INFORMATION
STORED IN SERVER DEVICE?

YES — A1    NO — A2

TB

| IDENTIFICATION INFORMATION | IMAGE INFORMATION | ADDRESS INFORMATION |
|---|---|---|
| O1 | IM1 | A1 |
| O2 | IM2 | A2 |
|  |  | A3 |

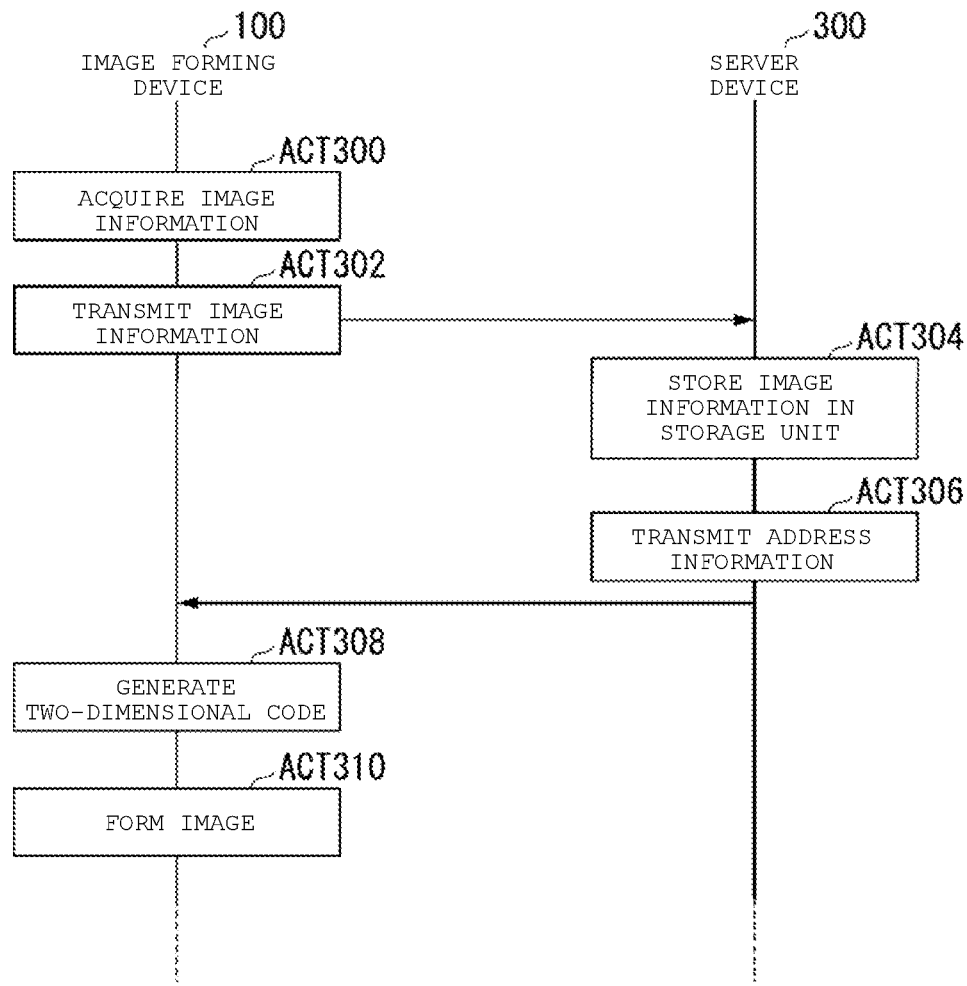

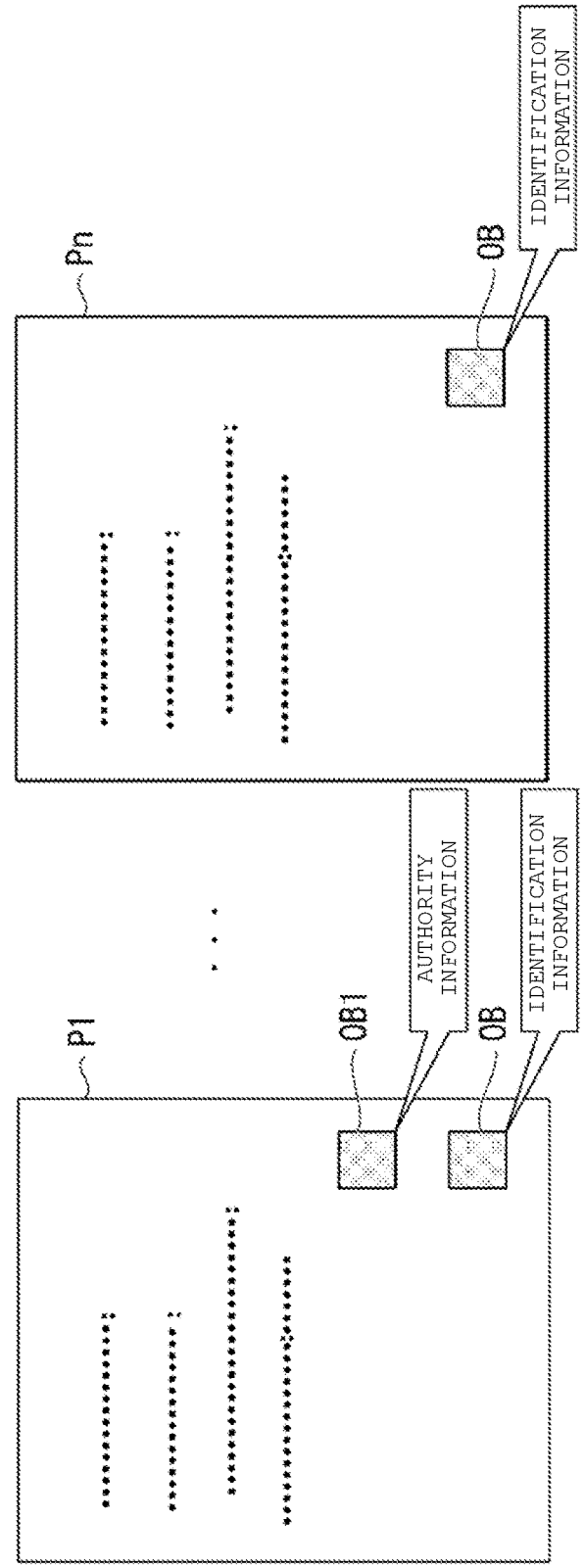

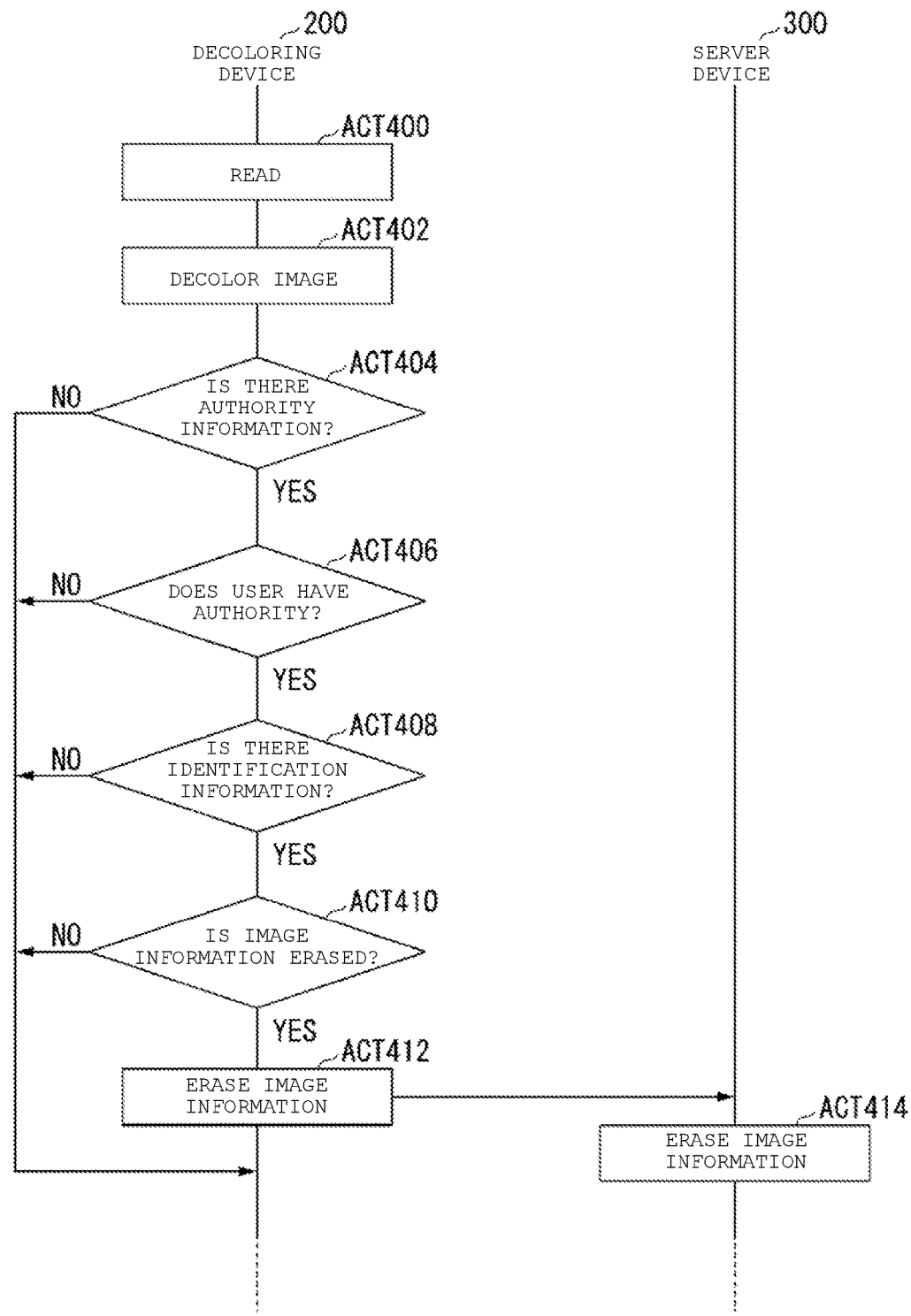

DECOLORING DEVICE, IMAGE PROCESSING SYSTEM, AND DECOLORING METHOD

CROSS-REFERENCE TO RELATED APPLICATION

This application is a continuation of U.S. patent application Ser. No. 15/279,064, filed on Sep. 28, 2016, the entire contents of which are incorporated herein by reference.

FIELD

Embodiments described herein relate generally to a decoloring device, an image processing system, and a decoloring method.

BACKGROUND

In order to reuse a sheet by decoloring an image formed on the sheet, a device is used which forms an image on the sheet using a decolorable coloring agent. Data of an image to be formed on the sheet may be stored in a storage device, and may remain in the storage device after the image is formed.

DESCRIPTION OF THE DRAWINGS

FIG. 8 is a diagram illustrating an example of an image which is formed by a printer unit.

FIG. 9 is a diagram illustrating an example of an information table which is stored in a storage unit.

FIG. 13 is a sequence diagram illustrating an operation of an image forming device and a server device according to a second embodiment.

FIG. 14 is a diagram illustrating an example of an information table which is stored in a storage unit.

FIG. 15 is a diagram illustrating examples of sheets which are used in a third embodiment.

FIG. 16 is a sequence diagram illustrating an operation of a decoloring device according to the third embodiment.

DETAILED DESCRIPTION

First Embodiment

According to one embodiment a decoloring device includes a reading unit, a decoloring unit, and a control unit. The reading unit is configured to read control information from a first image formed in a predetermined area of a sheet. The decoloring unit is configured to decolor a portion or entirety of a second image, different from the first image, formed on the sheet using a decolorable recording material. The control unit is configured to control erasing of the data of the second image from a storage device, based on the control information, in a case where the decoloring unit decolors the second image.

Hereinafter, a decoloring device, an image processing system, and a decoloring method according to the embodiment will be described with reference to the accompanying drawings.

Figure 1:
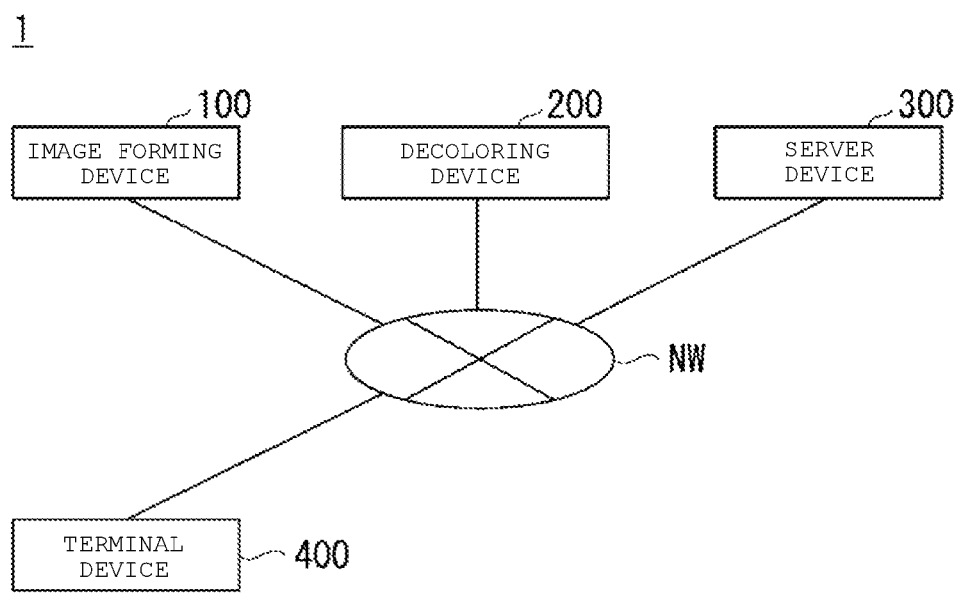
FIG. 1 is a configuration diagram of an image processing system according to an embodiment.

FIG. 1 is a configuration diagram of an image processing system 1 according to an embodiment.

The image processing system 1 includes an image forming device 100, a decoloring device 200, a server device 300, and a terminal device 400. The image forming device 100, the decoloring device 200, the server device 300, and the terminal device 400 are communicably connected to each other through a network NW. The network NW is an information communication network such as the Internet or the Local Area Network (LAN). The image processing system 1 may include multiple image forming devices 100, multiple decoloring devices 200, multiple server devices 300, and multiple terminal devices 400.

Figure 2:
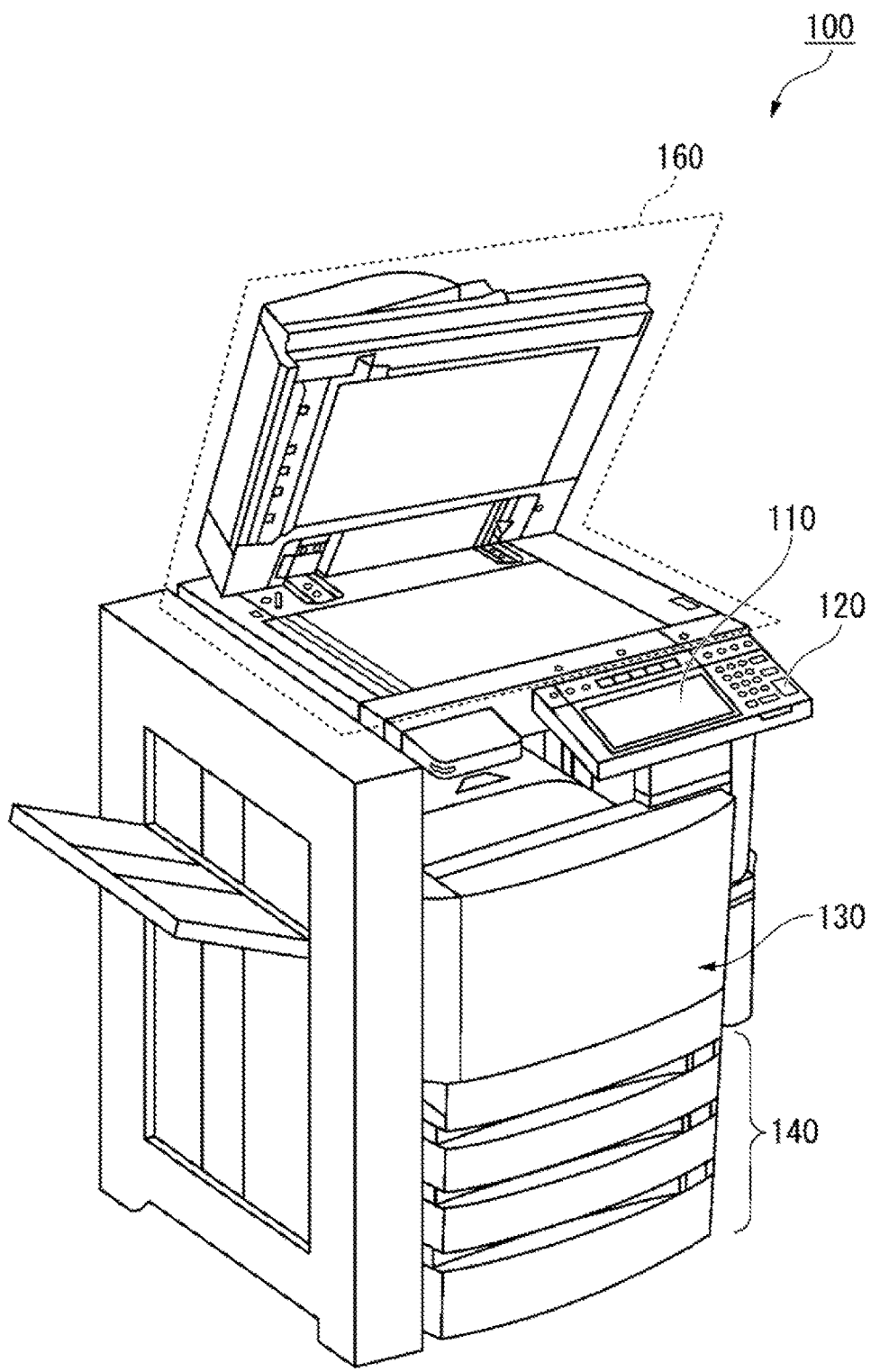
FIG. 2 is a perspective view of the image forming device whose configuration is illustrated in FIG. 1.

FIG. 2 is a perspective view of the image forming device 100 according to the embodiment. The image forming device 100 is, for example, a multifunction peripheral. The image forming device 100 includes a display 110, a control panel 120, a printer unit 130, and a sheet containing portion 140. The printer unit 130 of the image forming device 100 may be an electronic photographic device which fixes a toner image, or may be an inkjet device.

The image forming device 100 generates image information by reading an image from a sheet, thereby generating an image file. In addition, the image forming device 100 generates an image file based on the image data transmitted from the terminal device 400 through the network NW. The sheet is, for example, manuscripts, paper on which characters, images, or the like are described, or anything having an image readable by the image forming device 100.

The display 110 is an image display device such as a liquid crystal display or an organic electro luminescence (EL) display. The display 110 displays various types of information on the image forming device 100.

The control panel 120 includes multiple buttons. The control panel 120 is a portion that a user manipulates. The control panel 120 transmits a signal, according to manipulation of the user, to a control unit of the image forming device 100. The display 110 and the control panel 120 may be configured as a touch panel of one piece.

The printer unit 130 forms an image on the sheet, based on image information which is generated by an image reading unit 160 or image information which is received through a communication path. In addition, the printer unit 130 forms an image on the sheet, based on specific information which is generated by a code generation unit 150.

The printer unit 130 forms an image using, for example, the following processing. The printer unit 130 forms an electrostatic latent image on a photosensitive drum, based on the image information and the control information. The printer unit 130 forms a visible image by depositing a developer onto the electrostatic latent image. The developer is toner, ink, or the like for forming an image on paper. For example, the developer may be ink which decolors when exposed to a solvent. In addition, the developer may be heat decolorable toner. The heat decolorable toner decolors an image by applying a predetermined temperature. The solvent decolorable ink or heat decolorable toner are examples of "decolorable recording materials". Hereinafter, embodiments will be described in the context of the heat decolorable toner.

The printer unit 130 transfers a visible image onto the sheet. The printer unit 130 fixes the visible image on the sheet by heating or pressing the sheet. The sheet on which an image is formed may be contained in the sheet containing portion 140 or may be manually supplied.

The sheet containing portion 140 contains a sheet which is used for image formation of the printer unit 130.

Figure 3:
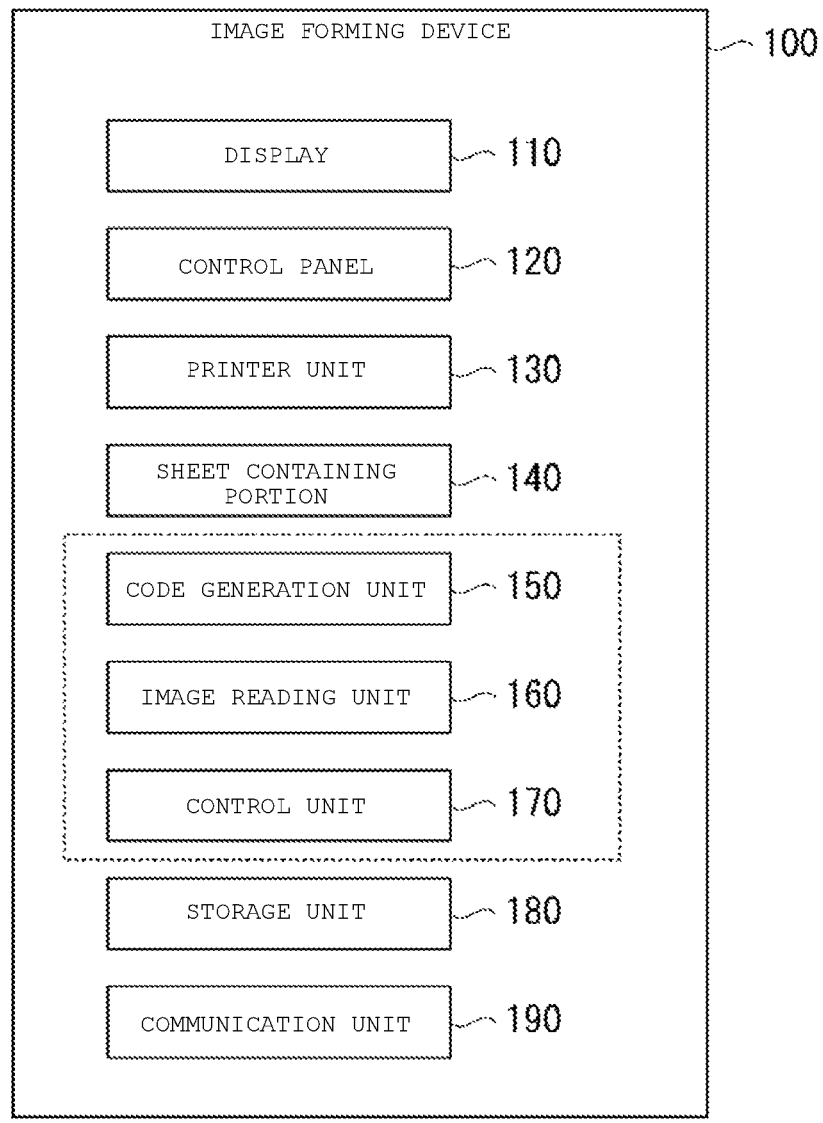
FIG. 3 is a functional configuration diagram of the image forming device of FIG. 2.

FIG. 3 is a functional configuration diagram of the image forming device 100. The image forming device 100 further includes the code generation unit 150, the image reading unit 160, a control unit 170, a storage unit 180, and a communication unit 190, in addition to the display 110. One or more of the code generation unit 150, the image reading unit 160, and the control unit 170 may include a processor such as a central processing unit (CPU) which executes a program.

The code generation unit 150 generates a one-dimensional barcode in which information is encoded, or a two-dimensional code. The two-dimensional code is, for example, a QR Code®. For example, the code generation unit 150 may generates the two-dimensional code containing image identification information. The image identification information is an example of "control information" used by the image processing system 1.

The image reading unit 160 is configured to read image information of a read target which is formed on the sheet by checking brightness and darkness of light. The image reading unit 160 temporarily stores the image information which is read in the storage unit 180. The control unit 170 transmits the stored image information to the server device 300 or another information processing device through the network, using the communication unit 190. The stored image information may be formed on the sheet by the printer unit 130 as an image. The control unit 170 may erase the image information which is stored in the storage unit 180 of the image forming device 100, after the image is formed on the sheet by the printer unit 130. The communication unit 190 is a communication interface for communicating with the decoloring device 200 or the server device 300.

Figure 4:
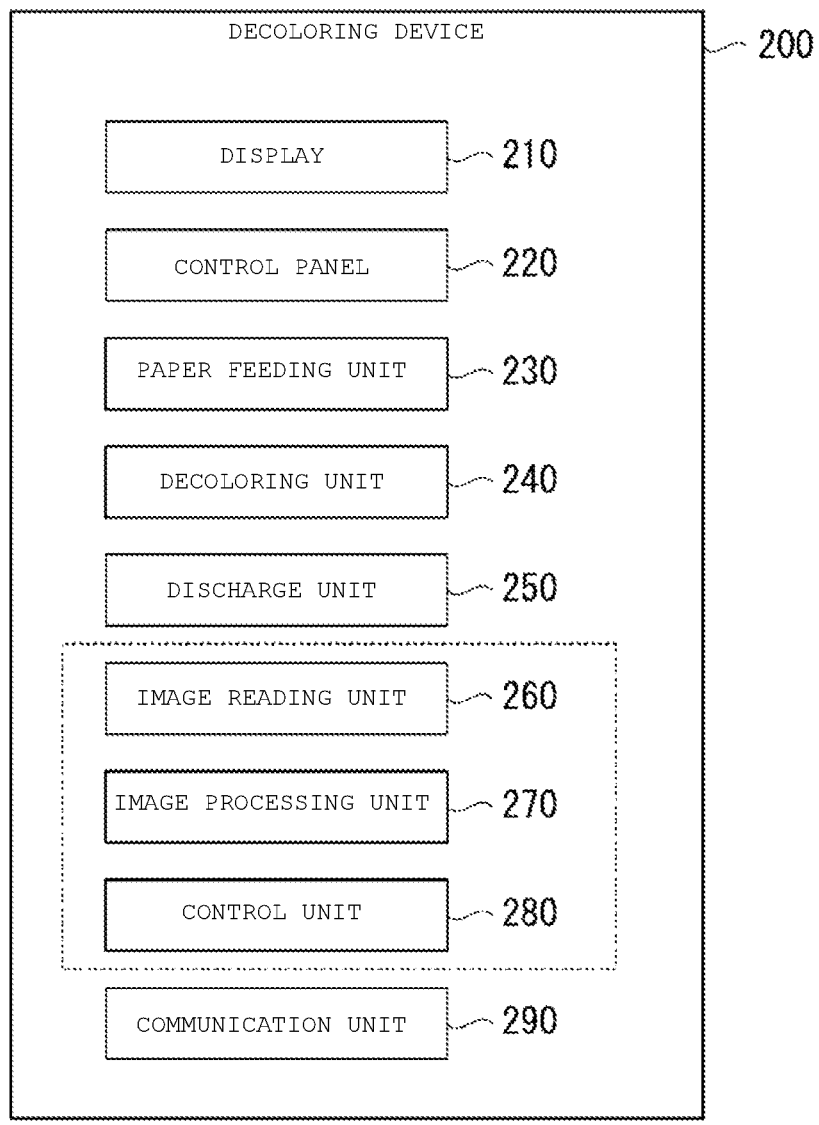
FIG. 4 is a functional configuration diagram of a decoloring device according to an embodiment.

FIG. 4 is a functional configuration diagram of the decoloring device 200.

The decoloring device 200 includes a display 210, a control panel 220, a paper feeding unit 230, a decoloring unit 240, a discharge unit 250, an image reading unit 260, an image processing unit 270, a control unit 280, and a communication unit 290. One or more of the image reading unit 260, the image processing unit 270, and the control unit 280 may include a processor such as a CPU which executes a program. In addition, one or more of the functional units may include hardware such as a large scale integration (LSI), an application specific integrated circuit (ASIC), or a field-programmable gate array (FPGA).

The decoloring device 200 decolors an image which is formed using heat decolorable toner.

The image reading unit 260 and the image processing unit 270 are examples of "reading units".

The display 210 has the same functional configuration as the display 110. The control panel 220 has the same functional configuration as the control panel 120.

Figure 5:
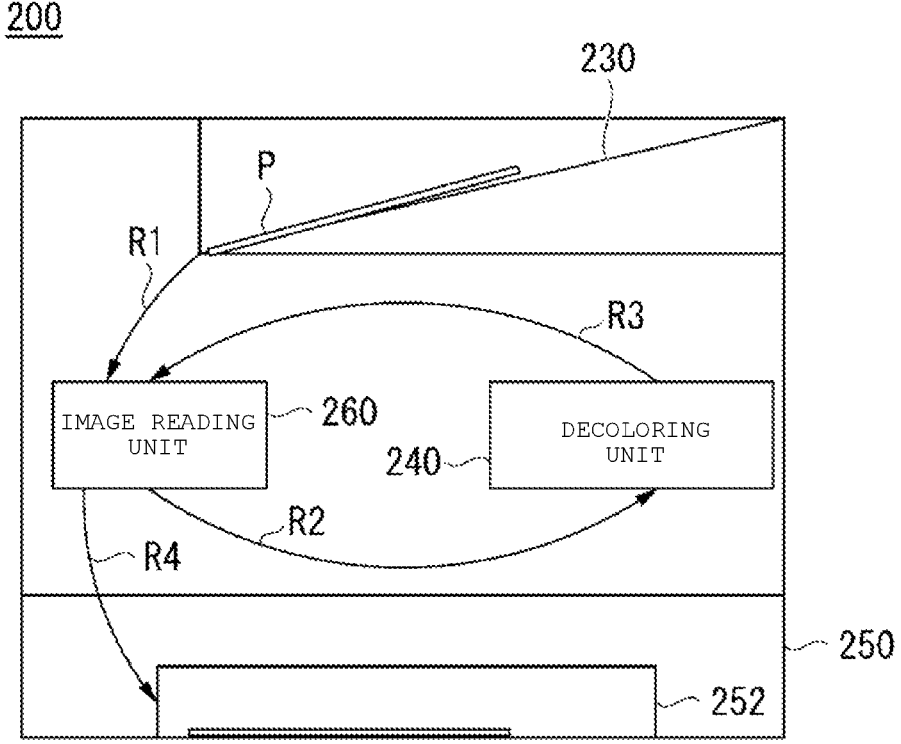
FIG. 5 is a schematic diagram of a decoloring device according to an embodiment.

FIG. 5 is a schematic diagram of the decoloring device 200 according to an embodiment.

A transport unit (not illustrated) transports a sheet P through transport paths R1, R2, R3, and R4. The transport unit includes a transport roller and a motor. The transport roller and the motor are disposed in each position of the transport paths R1, R2, R3, and R4. The motor of the transport unit generates drive torque according to control of the control unit 280. The drive torque rotates the transport roller. A sheet P is transported to each unit through the transport paths R1, R2, R3, and R4 by rotation of the transport roller.

The paper feeding unit 230 includes a table on which the sheet P is loaded. The paper feeding unit 230 includes a paper feeding roller which is not illustrated. The sheet P which is loaded on the paper feeding unit 230 is taken in the transport path R1 by the paper feeding roller. Thereby, the sheet P is transported to the image reading unit 260 through the transport path R1.

The image reading unit 260 reads an image formed on the sheet P which is transported through the transport path R1 or the transport path R3. The image reading unit 260 may be an image sensor such as an image scanner. The image reading unit 260 transmits image information read from the sheet P to the image processing unit 270.

The image processing unit 270 performs processing such as decoding with respect to the image information which is read by the image reading unit 260. The image processing unit 270 converts the image information into a bit array or another format that can be recognized by a computer, based on the results of processing such as decoding. The image processing unit 270 reads the content of the information which is encoded in a two-dimensional code described on the sheet P. The image processing unit 270 recognizes identification information which is encoded in the two-dimensional code.

The decoloring unit 240 includes a heater which heats the sheet P. The heater is embedded in a heating roller. The sheet P is transported by the heating roller, and is heated by the heating roller. The heater may heat the heating roller, using an induction heating method.

The decoloring unit 240 heats a surface of the transported sheet P to a temperature higher than a predetermined temperature. The predetermined temperature is a temperature which can decolor the image formed on the sheet P. Thereby, the decoloring unit 240 decolors the image which is formed on the sheet P.

As well, the method of decoloring the image formed on the sheet is not limited to heating a surface of the sheet P. For example, methods of erasing an image may include exposing the image on the sheet, eliminating the image on the sheet and using a fluxing material for erasing the image on the sheet.

The discharge unit 250 transports the sheet P from the image reading unit 260 through the transport path R4. The discharge unit 250 contains the transported sheet P in a cassette 252.

The communication unit 290 is an interface for communicating among the image forming device 100, the server device 300, or the terminal device 400.

Figure 6:
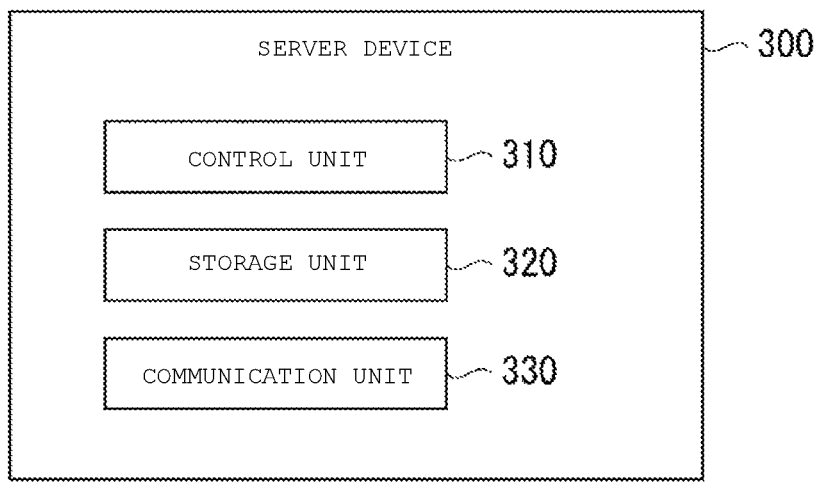
FIG. 6 is a functional configuration diagram of a server device.

FIG. 6 is a functional configuration diagram illustrating of the server device 300.

The server device 300 includes a control unit 310, a storage unit 320, and a communication unit 330. The control unit 310 is an example of an "erasure control unit". The communication unit 330 is an example of an "acquisition unit".

The storage unit 320 includes, for example, a nonvolatile memory medium, such as, a read only memory (ROM), a flash memory, a hard disk drive (HDD), or an SD card, or a volatile memory medium, such as, a random access memory (RAM) or a register.

The control unit 310 causes the storage unit 320 to store information which is transmitted by the image forming device 100. The control unit 310 controls the storage unit 320, based on the information which is transmitted from the decoloring device 200.

The storage unit 320 stores a program which is executed by a processor, and in addition, stores information which is transmitted by the image forming device 100. In addition, the storage unit 320 stores information which is transmitted by the terminal device 400 that communicates with the network NW.

The communication unit 330 is an interface for communicating with the image forming device 100, the decoloring device 200, or the terminal device 400.

Hereinafter, detailed processing which is performed by the image processing system 1 will be described.

Figure 7:
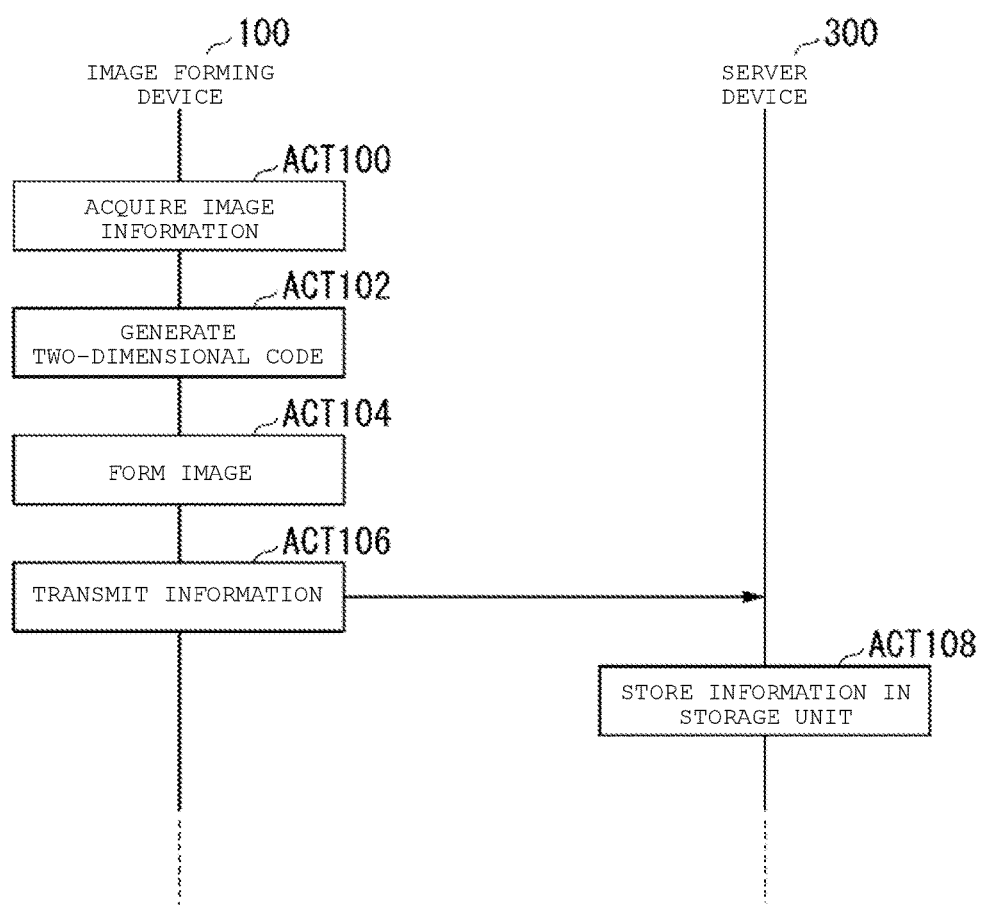
FIG. 7 is a sequence diagram illustrating an operation of the image forming device and the server device.

FIG. 7 is a sequence diagram illustrating an operation of the image forming device 100 and the server device 300.

First, the image forming device 100 acquires image information of a target whose image is formed on a sheet (ACT100). The image reading unit 160 may acquire the image information of the target. In addition, the image forming device 100 may acquire the image information of the target from the storage unit 180, the server device 300, or the terminal device 400 which is connected to the network NW.

Subsequently, the code generation unit 150 assigns identification information to the image information of the target, and generates a two-dimensional code that includes information which is obtained by encoding the identification information along with erasure information (ACT102).

The identification information is assigned to each target image, and is used for identifying the image information. The erasure information is used for instructing erasure of the image information from a storage device. The identification information and the erasure information is an example of "control information".

Subsequently, the printer unit 130 forms an image including a two-dimensional code OB on a sheet (ACT104). The printer unit 130 forms the image based on the image information which is generated by the image reading unit 160 and the two-dimensional code which is generated by the code generation unit 150. An image that is generated based on the image information which is generated by the image reading unit 160 is an example of a "second image". An image which is generated based on the two-dimensional code is an example of a "first image".

FIG. 8 is a diagram illustrating an example of an image which is formed by the printer unit 130.

The printer unit 130 forms the image information which is generated by the image reading unit 160 on the sheet P. The printer unit 130 forms the two-dimensional code OB (image) that includes the information which is obtained by encoding the identification information and the erasure information, in a margin (printing area different from the image information) of the sheet P.

The printer unit 130 may form the two-dimensional code OB (image) that includes information which is obtained by encoding the identification information and the erasure information, in the printing area in which the image information is formed, so that the two images overlap each other. For example, the printer unit 130 may form the image information which is generated by the image reading unit 160 and the two-dimensional code OB (image) in the same printing area using different colors from each other so as to overlap each other. In this case, the printer unit 130 forms the code OB and the image information on the sheet P such that the two-dimensional code OB and the image information can be identified, as woven pattern printing. Thereby, a user which uses the sheet P can recognize that the two-dimensional code OB is formed on the sheet P.

Subsequently, the control unit 170 transmits the image information and the identification information corresponding to the image information to the server device 300 using the communication unit 190 (ACT106).

Subsequently, the control unit 310 receives the information which is transmitted by the communication unit 190, and stores the received information in the storage unit 320 (ACT108). The received information is, for example, image information and the identification information corresponding to the image information. The control unit 310 stores the received information in an information table TB of the storage unit 320.

FIG. 9 is a diagram illustrating an example of the information table TB which is stored in the storage unit 320. For example, the image identification information is stored in the information table TB, corresponding to the image information. In addition, address information indicating an address of the storage area in which the image information is stored corresponds to the image information, in the information table TB.

Figure 10:
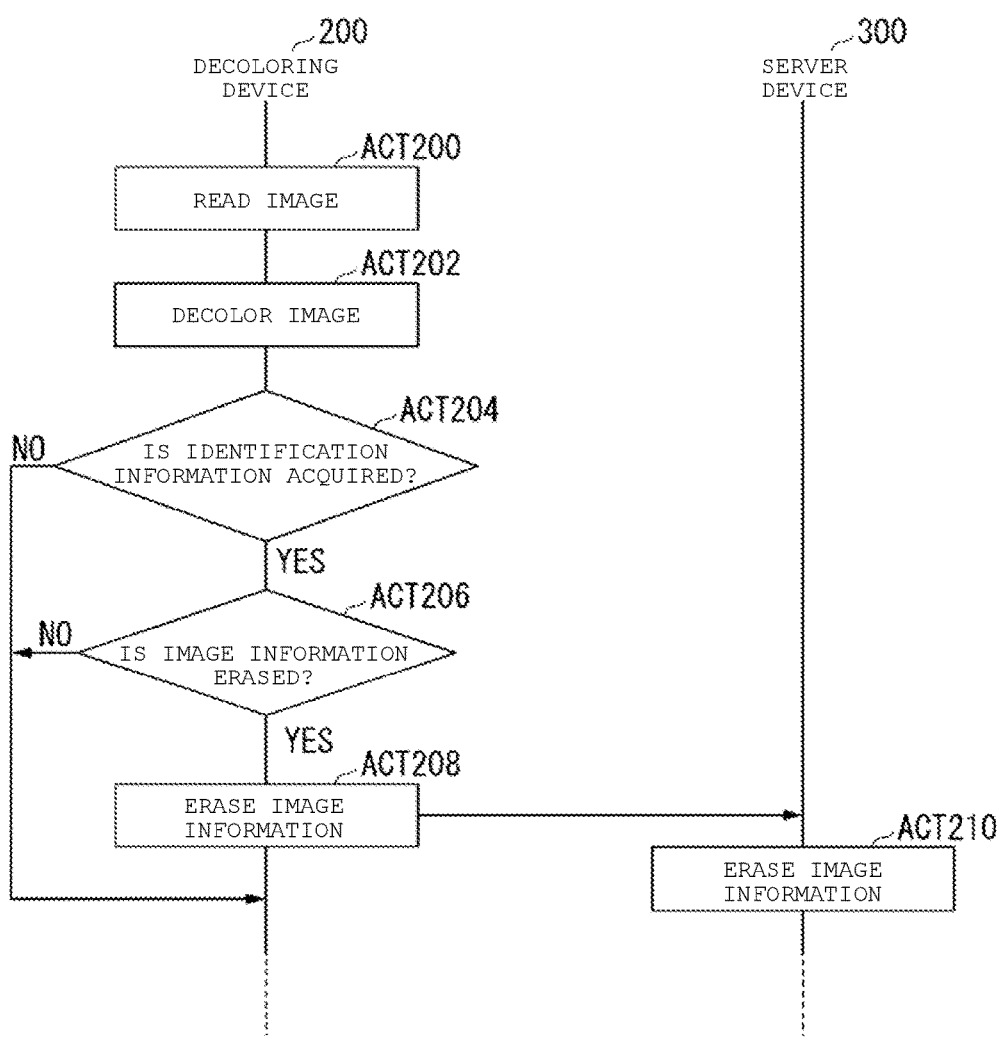
FIG. 10 is a sequence diagram illustrating an operation of the decoloring device and the server device.

FIG. 10 is a sequence diagram illustrating an operation of the decoloring device 200 and the server device 300. The processing described in connection with FIG. 10 is performed on the sheet P, which has a two-dimensional code OB that is obtained by encoding the identification information.

First, the image reading unit 260 reads the image including a two-dimensional code which is formed on the sheet P (ACT200).

Subsequently, the decoloring unit 240 decolors the image which is formed on the sheet P (ACT202).

The image processing unit 270 determines whether the identification information and the erasure information, encoded in the two-dimensional code OB based on the read image, can be acquired (ACT204).

In a case where the determination result is "NO" (ACT204; NO), processing of one routine of the present processing is terminated.

In a case where the determination result is "YES" (ACT204; YES), processing of ACT206 proceeds. That is, the control unit 280 queries a user on whether or not to erase the image information (ACT206).

Figures 11, 12:
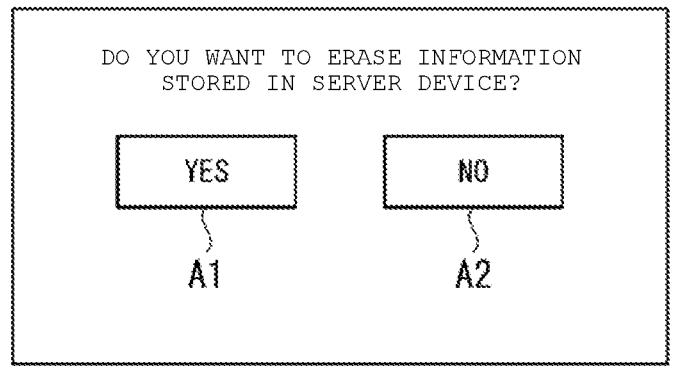
FIG. 11 is a diagram illustrating an example of a query image which queries a user on whether or not to erase image information.
FIG. 12 is a diagram schematically illustrating the information table in a case where the image information is erased.

FIG. 11 is a diagram illustrating an example of a query image which queries the user on whether or not to erase the image information.

The control unit 280 displays a query image QI on the display 210.

In addition, the query image QI includes, for example, a set area A1 and a set area A2. The set area A1 is, for example, an area for selecting erasure of the image information which is stored in the server device 300. The set area A2 is an area for selecting storage of the image information which is stored in the server device 300 without erasing the image information.

A user selects erasure of the image information using the control panel 220, for example by tapping the set area A1 of the display 210.

In a case where the user selects erasure of the image information (ACT206; YES), the control unit 280 performs processing of erasing the image information from the server device 300 (ACT208). The image information corresponds to the identification information which is acquired in ACT204.

In the processing of erasure, for example, the control unit 280 transmits an instruction signal to the server device 300 instructing erasure of the image information. The instruction signal includes the identification information corresponding to the image information to be erased.

In a case where the user selects no erasure of the image information (ACT208; NO) by tapping the set area A2, the processing of one routine of the present processing is terminated.

If the erasure instruction signal is transmitted from the decoloring device 200 to the server device 300, the control unit 310 erases the image information which is stored in the storage unit 320 (ACT210).

For example, the control unit 310 receives the identification information and the erasure information from the decoloring device 200. The control unit 310 erases the image information corresponding to the received identification information, from the storage unit 320.

FIG. 12 is a diagram schematically illustrating the information table TB in a case where the image information is erased.

For example, the control unit 310 erases image information "IM3" corresponding to identification information "03" which is stored in the information table TB, in a case where the control unit 310 receives the identification information "03" and the erasure information. The control unit 310 may transmit information indicating that the image information "IM3' is erased, to the image forming device 100. In this case, the decoloring device 200 displays the information indicating that the image information "IM3" is erased, on the display 210.

In addition, the image forming device 100 may form image information of a target on multiple sheets P. The two-dimensional code OB which is obtained by encoding the same identification information is formed on the multiple sheets P. The decoloring device 200 transmits the same identification information to the server device 300 more than once, when processing the multiple sheets P. In a case where the identification information is received, the control unit 310 erases the image information corresponding to the identification information. After the image information is erased, the control unit 310 acquires the same identification information as the identification information corresponding to the erased image information. At this time, the control unit 310 may transmit the information indicating that the image information corresponding to the identification information is erased, to the decoloring device 200. The decoloring device 200 may display the information indicating that the image information is previously erased, on the display 210. It should be noted that different identification information may be assigned to each sheet.

In the present embodiment, the erasure information which is encoded to the two-dimensional barcode is described, but there are embodiments in which the erasure information is not encoded in the two-dimensional barcode. In such cases, identification information regarding image information to be erased may be received from the decoloring device, and the server device 300 may erase the image information corresponding to the identification information from the storage unit 320, according to the identification information which is received from the decoloring device 200.

A function of the image processing unit 270 may be included in the server device 300. In this case, the decoloring device 200 transmits information (image information) indicating an image on the sheet P to the server device 300. An image processing unit of the server device 300 receives the image information.

In the first embodiment described above, the decoloring device 200 performs the processing of erasing the image information corresponding to control information, from the server device 300. Thereby, the image processing system 1 can erase unnecessary image information from a storage device, after an image formed on the sheet P is erased.

Second Embodiment

In the first embodiment, identification information is encoded in the two-dimensional code OB. In a second embodiment, address information is encoded in the two-dimensional code OB. The address information indicates a position corresponding to a storage area included in the storage unit 320. The address information is an example of "control information".

FIG. 13 is a sequence diagram illustrating an operation of an image forming device and a server device according to the second embodiment.

First, the image forming device 100 acquires image information of a target (ACT300). Subsequently, the control unit 170 transmits the image information to the server device 300 (ACT302). Subsequently, the control unit 310 receives the image information which is transmitted by the communication unit 190, and stores the acquired image information in the storage unit 320 (ACT304). The control unit 310 stores the received image information and address information of a storage area thereof in an information table TB1 of the storage unit 320 so as to correspond to each other.

FIG. 14 is a diagram illustrating an example of the information table TB1 which is stored in the storage unit 320. For example, the information table TB1 includes a list of the image information and the address information corresponding to the image information.

Subsequently, the control unit 310 transmits the address information of the storage area which stores the received image information to the image forming device 100 (ACT306), which receives the information.

The code generation unit 150 generates the two-dimensional code OB which is obtained by encoding the address information and the erasure information (ACT308).

Subsequently, the printer unit 130 forms an image including the two-dimensional code OB on a sheet (ACT310). The image is formed based on the image information which is generated by the image reading unit 160 and the information which is generated by the code generation unit 150. Thereby, the processing of one routine of the present processing is terminated.

Hereinafter, processing which is performed by the decoloring device 200 and the server device 300 will be described.

First, the image reading unit 260 reads an image formed on the sheet P. Subsequently, the decoloring unit 240 decolors an image formed on the sheet P. Further, the image processing unit 270 acquires the address information and the erasure information which is encoded in the two-dimensional code OB formed on the image. Subsequently, the control unit 280 queries a user on whether or not to erase the image information corresponding to the acquired address information.

In a case where the user selects erasure of the image information, the control unit 280 performs processing of erasing the image information from the server device 300.

The processing of erasing is that the control unit 280 transmits an instruction signal to the server device 300 instructing the server device 300 to erase the image information. For example, the instruction signal includes the address information corresponding to the image information to be erased.

In a case where the user selects no erasure of the image information, the processing of one routine of the present processing is terminated.

Subsequently, if selected by the user, the control unit 310 erases the image information which is stored in the storage unit 320, based on the control from the decoloring device 200. For example, the control unit 310 receives an instruction signal including the address information and the erasure information from the decoloring device 200. The control unit 310 erases the image information, which is stored in the storage area, corresponding to the address information which is included in the acquired instruction signal, from the storage unit 320.

In the second embodiment described above, address information is used instead of identification information. The image processing system 1 can specify image information to be erased, base on the address information, and thus, processing is simplified.

Third Embodiment

In the first embodiment, identification information is encoded to the two-dimensional code OB. In a third embodiment, a two-dimensional code OB1 which is obtained by encoding authority information is further formed on the sheet P, in addition to the two-dimensional code OB which is obtained by encoding the identification information. The authority information indicates authority of erasing the image information that is stored in the server device 300. The authority information is an example of information which is included in the "control information".

FIG. 15 is a diagram illustrating examples of sheets P1 to Pn which are used in the third embodiment. "n" is an arbitrary natural number. Hereinafter, in a case where the sheets P1 to Pn are not intended to be distinguished from each other in the process described, the "n" sheets are referred to collectively as the sheet P.

The image forming device 100 forms an image on the multiple sheets P1 to Pn from the image information of a target. The image forming device 100 forms, for example, the two-dimensional code OB1 which is obtained by encoding the authority information and the two-dimensional code OB which is obtained by encoding the identification information, on the sheet P1. The image forming device 100 forms the two-dimensional code OB which is obtained by encoding the identification information, for example, on the sheets P2 to Pn.

The image forming device 100 may form the two-dimensional code OB which is obtained by encoding the identification information and the authority information, on the sheet P1.

FIG. 16 is a sequence diagram illustrating an operation of a decoloring device 200 according to the third embodiment.

First, the image reading unit 260 reads the image formed on the sheet P (ACT400). Subsequently, the decoloring unit 240 decolors the image formed on the sheet P (ACT402).

Subsequently, the image processing unit 270 determines whether or not the authority information which is encoded to the two-dimensional code OB1 formed on the image can be acquired (ACT404).

In a case where the determination result is "NO" (ACT404; NO), processing of one routine of the present processing is terminated.

In a case where the determination result is "YES" (ACT404; YES), the control unit 280 performs the following processing. The control unit 280 determines whether or not a user has authority of being able to erase the image information, based on the acquired authority information (ACT406).

The control unit 280 displays an image which requires input operation of a password or identification information assigned to an operator, on the display 210.

The control unit 280 acquires the password which is inputted to the control panel 220 by the operator or the identification information assigned to the operator. Hereinafter, a case where the control unit 280 acquires a password will be described.

The control unit 280 determines whether or not the password stored in a storage unit of the decoloring device 200 coincides with a password inputted by the operator. In a case where the passwords coincide with each other, the control unit 280 determines that the operator which performs the input operation is an operator having authority to erase the image information. In a case where the passwords do not coincide with each other, the control unit 280 determines that the operator which performs the input operation is an operator having no authority to erase the image information.

In a case where the determination result is "NO" (ACT406; NO), processing of one routine of the present processing is terminated.

In a case where the determination result is "YES" (ACT406; YES), the image processing unit 270 determines whether or not the identification information which is encoded in the two-dimensional code OB formed on the image can be acquired (ACT408).

In a case where the determination result is "NO" (ACT408; NO), processing of one routine of the present processing is terminated.

In a case where the determination result is "YES" (ACT408; YES), the control unit 280 queries the user on whether or not to erase the image information (ACT410). For example, the control unit 280 performs query by displaying a query image on the display 210.

In a case where the determination result is "NO" (ACT410; NO), processing of one routine of the present processing is terminated. For example, in a case where the user selects no erasure of the image information, the processing of one routine of the present processing is terminated.

In a case where the determination result is "YES" (ACT410; YES), the control unit 280 performs processing of erasing the image information from the server device 300 (ACT412). The processing of erasing indicates that the control unit 280 transmits the identification information which is acquired in ACT408 and an instruction signal which instructs erasure of the image information, to the server device 300. A case where the determination result is "YES" is, for example, a case where the user selects erasure of the image information. Thereby, the processing of one routine of the present processing is terminated.

The server device 300 receives the identification information which is transmitted by the aforementioned processing and the instruction signal which instructs erasure of the image information. The control unit 310 erases the image information which is stored in the storage unit 320, based on the received information (ACT414).

According to the third embodiment described above, when the decoloring device 200 determines that the operator has authority of erasing the image information, the decoloring device 200 transmits the instruction signal which instructs erasure of the image information to the server device 300. Thus, the image processing system 1 can perform precise management of the image information which is stored in a storage device. As a result, convenience for a user is increased.

Fourth Embodiment

In the first embodiment, the decoloring device 200 transmits an instruction signal which instructs erasure of image information to the server device 300. In an image processing system 1 according to a fourth embodiment, the decoloring device 200 transmits image information corresponding to an image which is formed on the sheet P to the server device 300. The server device 300 stores the transmitted image information in the storage unit 320.

Figure 17:
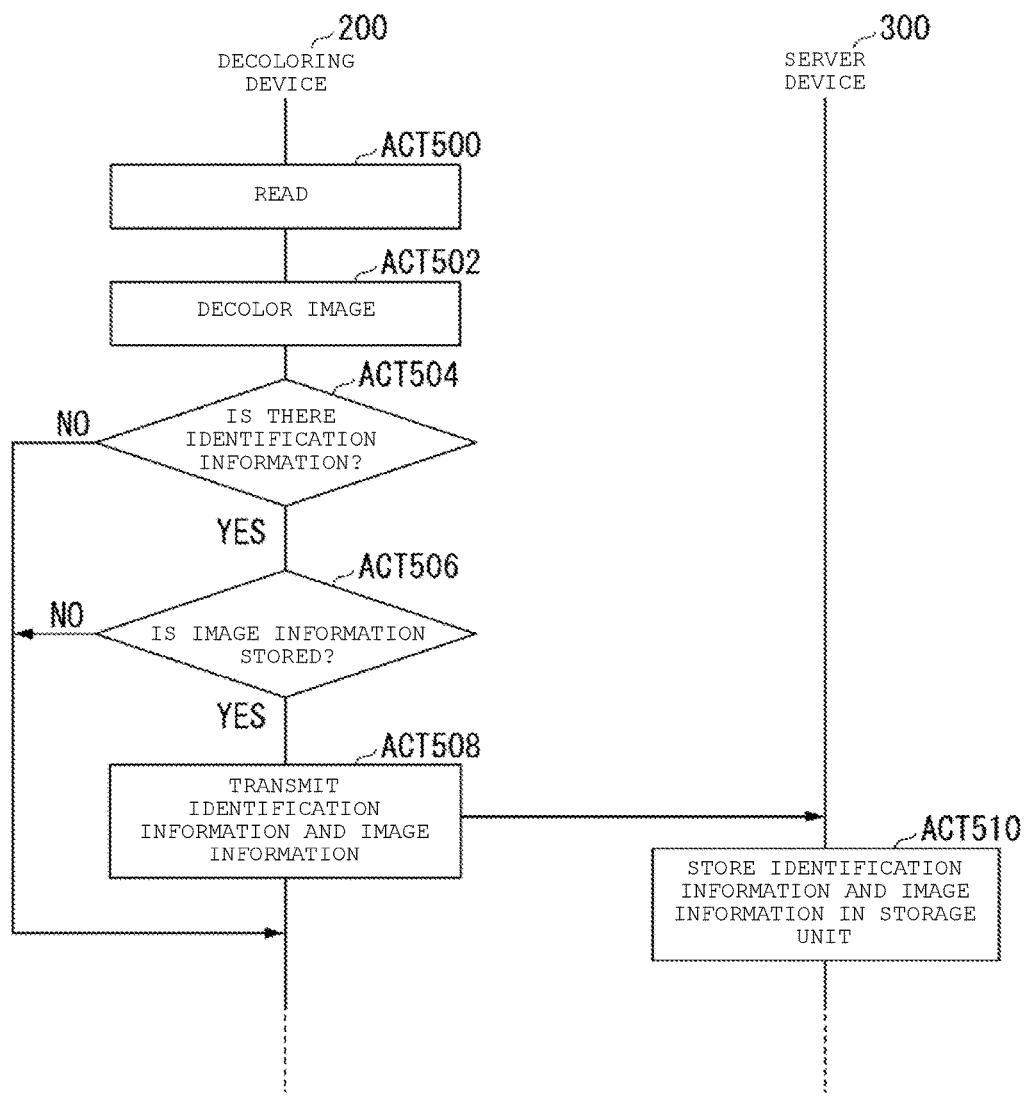
FIG. 17 is a sequence diagram illustrating an operation of a decoloring device according to a fourth embodiment.

FIG. 17 is a sequence diagram illustrating an operation of the decoloring device 200 according to the fourth embodiment.

First, the image reading unit 260 reads an image formed on the sheet P (ACT500). Subsequently, the decoloring unit 240 decolors the image formed on the sheet P (ACT502).

The image processing unit 270 determines whether or not identification information which is encoded in the two-dimensional code OB formed on the image can be acquired (ACT504).

In a case where the determination result is "NO" (ACT504; NO), processing of one routine of the present processing is terminated.

In a case where the determination result is "YES" (ACT504; YES), the control unit 280 queries a user on whether or not to remember the image information (ACT506). For example, the control unit 280 performs query by displaying a query image on the display 210.

In a case where the determination result is "NO" (ACT506; NO), meaning no remembrance of the image information, the processing of one routine of the present processing is terminated.

In a case where the determination result is "YES" (ACT506; YES), the control unit 280 performs the following processing. The control unit 280 transmits an instruction signal which instructs remembrance of the image information to the server device 300 (ACT508). In this case, the control unit 280 transmits the identification information which is acquired in ACT504 and the image information to the server device 300. Based on the identification information received from the decoloring device 200, the server device 300 overwrites the image information which was previously stored in the storage unit (ACT510). Thereby, the processing of one routine of the present processing is terminated.

According to the fourth embodiment described above, the decoloring device 200 determines whether or not to store the image information in the server device 300, based on the identification information. As a result, convenience of a user is increased.

The image processing system 1 may not include the server device 300. In this case, the image forming device 100 stores the image information of a target in the storage unit 180. In a case where control information is acquired, the decoloring device 200 transmits the control information to the image forming device 100. In a case of receiving the control information from the decoloring device 200, the image forming device 100 erases the image information corresponding to the control information which is stored in the storage unit 180.

In addition, the decoloring device 200 may be included in the image forming device 100 and the decoloring device 200 and the image forming device 100 may be function as one device.

According to at least one of the embodiments described above, a decoloring device includes a reading unit configured to read control information for controlling a storage device from a first image formed on a predetermined area of a sheet; a decoloring unit configured to decolor a portion, or the entirety, of a second image formed on the sheet using a decolorable recording material; and a control unit that erases the data of the second image from the storage unit, based on the control information, in a case where the decoloring unit decolors the second image. Accordingly, it is possible to erase unnecessary image information from the storage unit, after the image formed on the sheet is decolored.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing method, comprising:
   in a decoloring device:
      reading control information from a first image formed in a predetermined area of a sheet;
      decoloring at least a portion of a second image that is different from the first image and formed on the sheet using a decolorable recording material; and
      controlling erasing of data of the second image from a first storage device connected to the decoloring device based on the control information if the second image is decolored and transmitting an instruction signal for instructing erasure of the data of the second image; and
   in a server device:
      receiving the instruction signal from the decoloring device; and
      erasing the data of the second image from a second storage device based on the instruction signal.

2. The image processing method according to claim 1, further comprising:
   in the decoloring device:
      acquiring address information included in the control information, the address information indicating an address of a storage area at which the data of the second image is stored in the second storage device; and transmitting the acquired address information; and
in a server device:
  receiving the address information from the decoloring device; and
  using the address information in erasing the data of the second image in the second storage device.

3. The image processing method according to claim 1, further comprising:
in the decoloring device:
  acquiring authority information included in the control information, the authority information indicating an authority for erasing the data of the second image from the second storage device; and
  transmitting the authority information; and
in a server device:
  receiving the authority information from the decoloring device; and
  erasing the data of the second image from the second storage device according to the authority information.

4. The image processing method according to claim 1, further comprising:
  causing a display to display a query image for querying a user regarding whether the data of the second image is to be erased from the second storage device if the second image has been decolored.

5. The image processing method according to claim 4, further comprising:
in the server device, erasing the second image data from the second storage device after the user indicates the data of the second image is to be erased.

6. The image processing method according to claim 1, wherein
the decoloring device is connected to the server device through a network.

7. The image processing method according to claim 1, wherein the first image is a code image obtained by encoding the control information.

8. An image processing method, comprising:
reading control information from a first image formed in a predetermined area of a sheet having a second image different from the first image that is formed on the sheet using a decolorable recording material;
in a decoloring device, decoloring at least a portion of the second image;
based on the control information read from the first image, controlling erasing of data of the second image from a first storage device connected to the decoloring device after the second image has been decolored and transmitting an instruction signal for instructing erasure of the data of the second image from a second storage device connected to the decoloring device; and
erasing the data of the second image from the second storage device based on the instruction signal.

9. The image processing method of claim 8, wherein the second storage device is connected to a server device that receives the transmitted instruction signal.

* * * * *